UNITED STATES PATENT OFFICE.

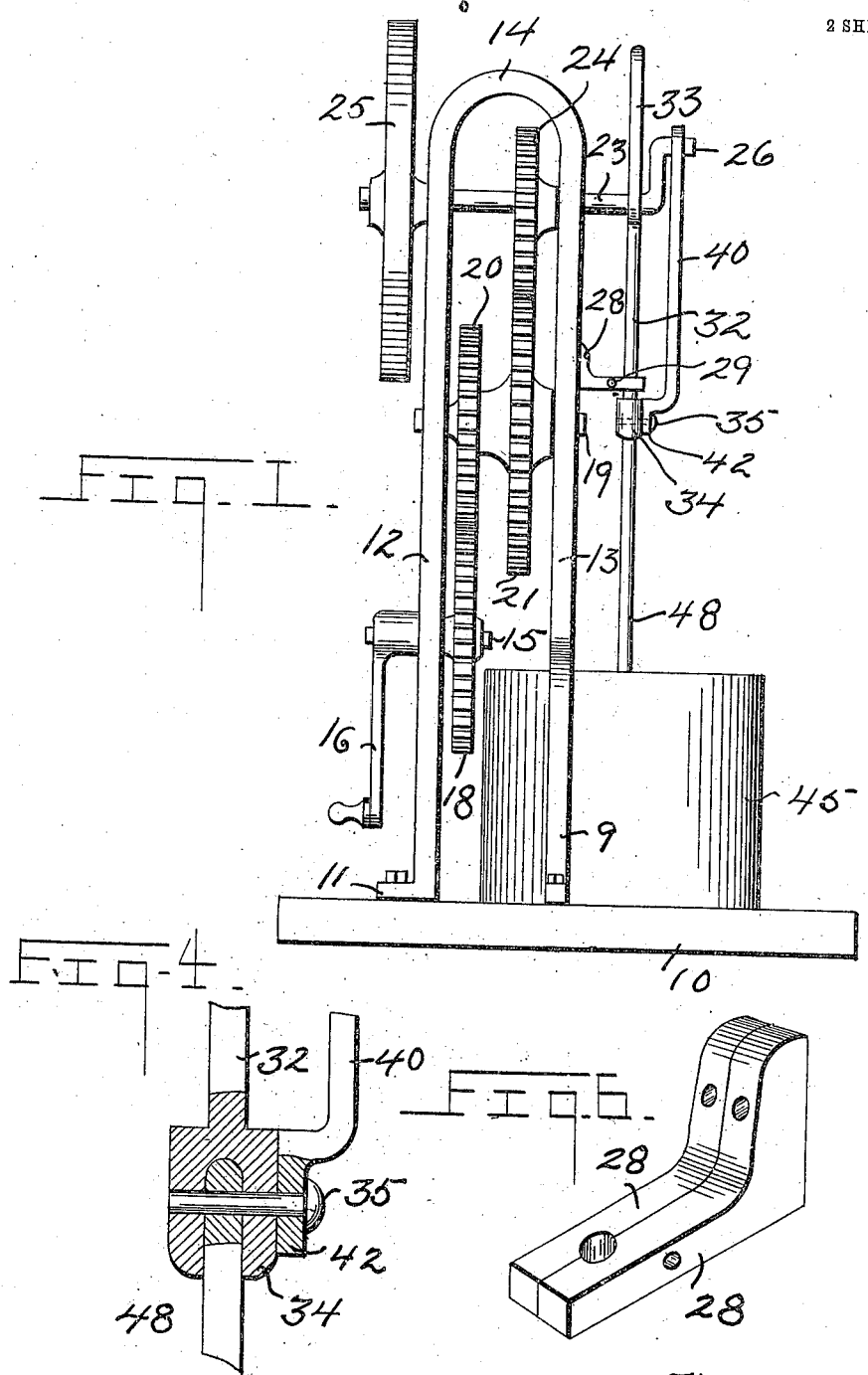

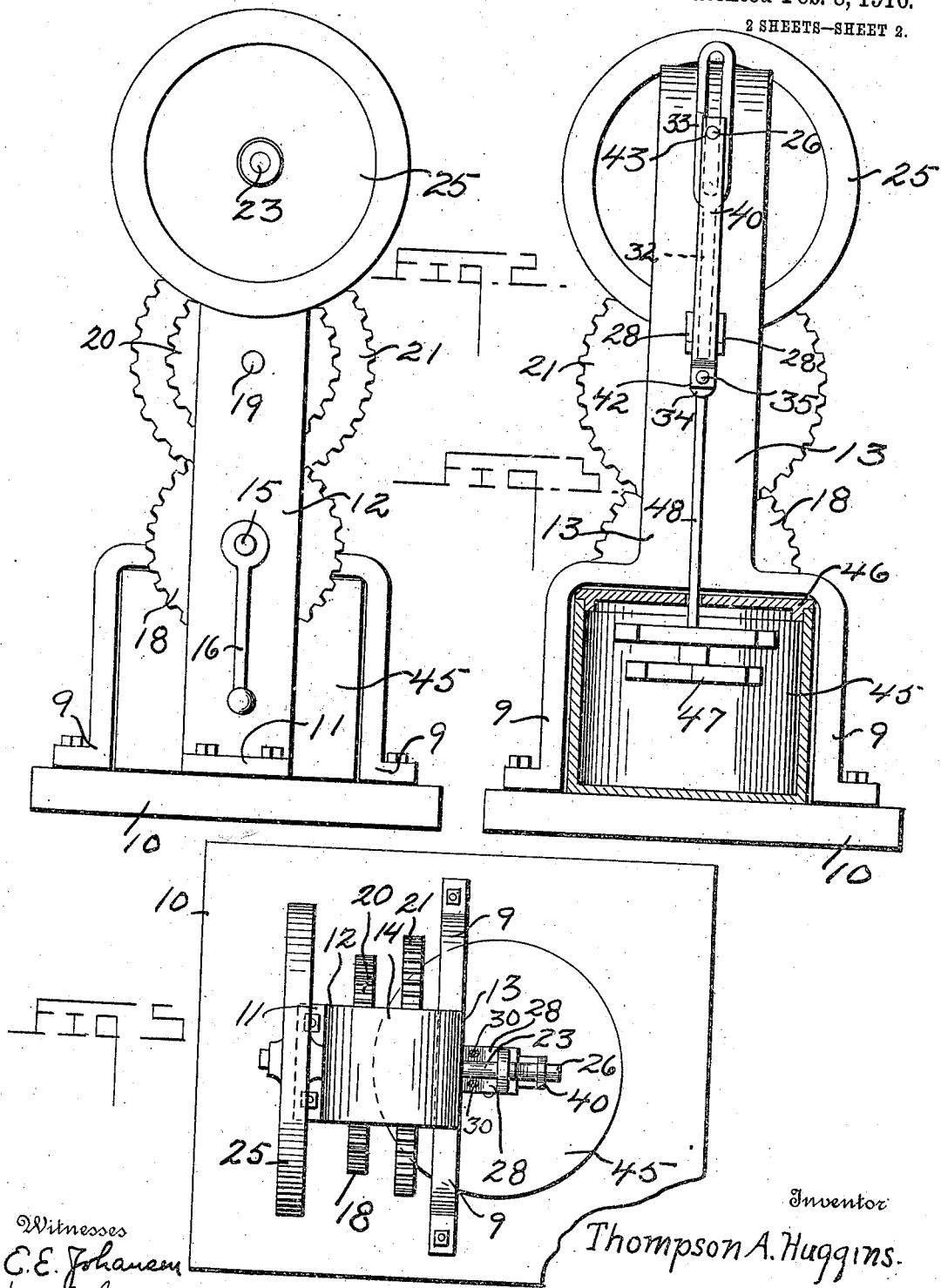

THOMPSON A. HUGGINS, OF ANSON, TEXAS.

CHURN.

948,546.  Specification of Letters Patent.  Patented Feb. 8, 1910.

Application filed August 10, 1909. Serial No. 512,137.

*To all whom it may concern:*

Be it known that I, THOMPSON A. HUGGINS, a citizen of the United States, residing at Anson, in the county of Jones and State of Texas, have invented certain new and useful Improvements in Churns, of which the following is a specification.

This invention relates to certain new and useful improvements in churns.

The object of my invention is to provide an inexpensive simply constructed and readily operated mechanism, arranged to reciprocate a churn dasher.

A further object is, to provide a churn comprising an upright cylindrical vessel, used in connection with a dasher shaft detachably secured to a vertically reciprocated loop bar operated by a gear driven pitman.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings which form a part of this specification, and in which like numerals of reference indicate similar parts in the several views, Figure 1 shows a side elevation of a churn embodying the features of my invention, disclosing the dasher in its extreme upward position. Fig. 2 is a front view of the churn. Fig. 3 is a rear view. Fig. 4 is an enlarged section through the coupling. Fig. 5 is a top view disclosing the position of the cream holding vessel. Fig. 6 shows a detail of the guiding ear.

In carrying out the object of my invention, I employ a suitable base 10, which is preferably rectangular in outline, to which is secured a recurved frame bar comprising the sections 12 and 13, held in parallel spaced relation and connected by the curved portion 14. The frame member 12 has a terminal securing ear 11, through which extends fastening screws as shown. The member 13 has its lower end forked, and ending in the two similar securing standards 9, as shown in Fig. 3.

Extending through a bearing opening within the frame member 12, is the arbor 15, to which is secured the operating crank 16, upon one side, and the driving gear 18, upon the other. The gear 18, counterbalances the crank 16. Above the arbor is the gear shaft 19, to which is secured the gear 21, and the pinion 20, this shaft being held within suitable registering bearing openings within the frame members 12 and 13. Held above the gear shaft 19, and extending beyond the frame members within which it is held, is the crank shaft 23. At one end this shaft carries the flywheel 25, while between the frame members is secured the pinion 24, meshing with the gear 21. The pinion 20 as shown, meshes with the driving gear 18. By this means, on turning the crank 16 an accelerated movement is imparted to the crank shaft 23.

Secured to the frame member 13, is a guide ear 28, in the form of two similar half-members 28, held together by means of the pin 29, and the screws 30. Slidably held within the ear 28, is the bar 32, having the guide loop 33, to the lower end of which is secured the socket 34 having a transverse opening, to receive the pin 35. The loop 33, as shown, is slidably held upon and guided by the crank shaft 23, the lower end of the bar 32 reciprocating within the ear 28. The ear is made in two parts so that the bar may be introduced, the ear being positioned between the link and the socket.

Held to the crank 26, of the shaft 23, is the pitman 40, having the upper bearing eye 43, and the lower pin head 42, this head being secured to the socket 34, by means of the pin 35.

The standards 9, and the frame member 12, are so spaced, as to snugly receive the cylindrical vessel 45, having the lid 46, this vessel containing the churn dasher 47, the dasher staff 48 projecting through an opening centrally positioned within the lid 46. This dasher staff 48 has an opening within its upper end to receive the pin 35, so that this pin serves a double purpose in holding both the pitman and the staff to the socket 34.

The dashers 47, are of any approved form.

From the foregoing, it will be seen that the main structural advantages of my invention reside in the especially arranged standard receiving the churn, the guiding loop bar, the coupling socket and the pitman connection.

The operation of my device is extremely simple. On actuating the crank 16, the operation sets the train of gearing in motion, the speed of which is nicely regulated and controlled, by the flywheel 25.

Having thus described my said invention what I claim as new and desire to secure by United States Letters Patent is:

A churn including a re-curved frame bar comprising two sections held in parallel spaced relation, one of said sections having its lower end forked, an arbor carried by said unforked section, a crank secured to said arbor, a driving gear secured to said arbor, a gear shaft held by both of said frame sections, a gear having a connected pinion held upon said shaft, said driving gear meshing with said pinion, a crank shaft above said gear shaft carried by both of said frame sections and extending beyond the frame, a fly wheel connected to one projecting end of said crank shaft, a pinion carried by said crank shaft meshing with said second mentioned gear, a pitman carried by the crank of said shaft, a bar having a loop surrounding said crank shaft and provided with a pin head at its lower end, said loop bar being guided at its upper end by said crank shaft, a churn dasher having a stem, and a pin connecting the lower end of said pitman to said head, and securing said stem within said pin head.

In testimony whereof I affix my signature, in presence of two witnesses.

THOMPSON A. HUGGINS.

Witnesses:
E. V. ALTMAN,
P. S. STEWART.